Patented Mar. 7, 1950

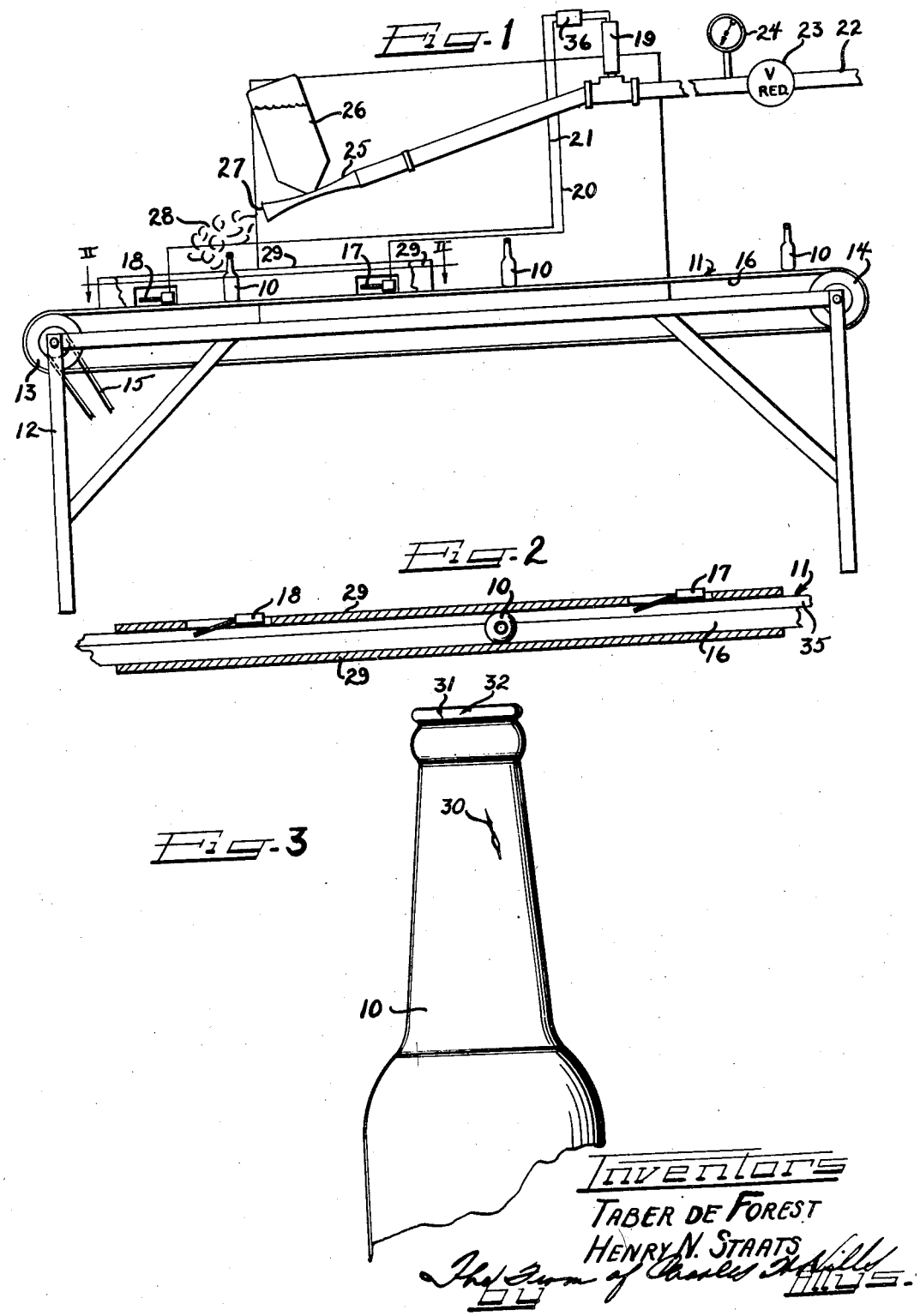

2,499,466

UNITED STATES PATENT OFFICE 2,499,466

METHOD OF DETECTING SURFACE DISCONTINUITIES IN ELECTRICALLY POOR CONDUCTIVE SURFACES

Taber de Forest, Northbrook, and Henry N. Staats, Chicago, Ill., assignors, to Magnaflux Corporation, Chicago, Ill., a corporation of Delaware Application February 18, 1946, Serial No. 648,234

22 Claims. (Cl. 175—183)

This invention relates to a method of detecting surface discontinuities in surfaces having relatively poor electrically conductive properties. More particularly, the invention relates to a method of testing for surface discontinuities, such as cracks or the like, in articles formed of or surfaced with vitreous, ceramic, plastic or other materials that may be generally referred to as dielectrics.

In the testing of glass bottles for surface cracks, we have found that if the bottles are first wet with water or a water-miscible liquid, preferably containing a surface tension reducing agent, and the surface then dried superficially, electrostatically charged finely divided particles are attached to the cracks and adhere thereto in preference to the unblemished or continuous portions of the surface. Under the preferred conditions for carrying out our invention, the electrostatically charged particles build up at the cracks in well-defined, comparatively dense agglomerations coextensive with the cracks. The result is a very definite indication not only of the presence and location of any cracks in the surface to which the electrostatically charged particles are applied, but also of the relative dimensions of the cracks. By the use of solid particles of a color contrasting with the color of the surface undergoing test very distinctive visual indications are given the observer of any cracks or discontinuities in the surface. There is thus provided a simple and quick method of testing for cracks and other surface discontinuities in electrically non-conducting materials.

There are a great many applications of the method of our invention that have considerable commercial significance. For instance, in the bottling of beer and other carbonated beverages, a great saving in time and money can be effected by testing the bottles and culling the defective ones before they are filled and capped. While visual inspection as heretofore employed served to detect bottles having major surface discontinuities, many of the cracks that are sufficient in magnitude to result in the subsequent breaking of the bottle during the capping operation, or when subsequently uncapping the bottle, are indiscernible to the unaided eye except by a very careful, time-consuming inspection.

By the use of our method, however, such surface discontinuities are made apparent at a glance and the bottles can be discarded before being filled and capped. There is thus saved not only the time and labor expended in filling and capping but also the cost of the contents of the bottle, and, in the case of malt beverages, the cost of the tax. These items total up to a very considerable sum in the brewing industry alone.

In applying our method to the testing of bottles and other containers of glass, ceramic material or of a synthetic plastic composition, we provide a conveyor for moving the prepared bottles along in sequence at a relatively rapid rate, with means for rotating the containers about their own axes as they are advanced by the conveyor. The containers are prepared by rinsing the surfaces thereof and superficially drying them. They are then in a condition to show indications of any cracks that may be present when a gaseous stream of electrostatically charged particles is directed against them. An operator standing along side the conveyor removes any container showing indications of dangerous surface cracks while letting the other bottles proceed to the washing, bottling, and capping stations.

We shall not attempt to explain the phenomenon forming the basis of the method of our invention, but should like to point out several observed facts. If the particles are not electrostatically charged, they are not preferentially attracted to the surface cracks or discontinuities even though the surface may have been previously prepared by rinsing in a liquid capable of wetting the surface and then superficially drying. While, of course, if the cracks were sufficiently large and therefore contained sufficient liquid in them to sensibly moisten the solid particles directed against the surface, the particles would naturally adhere to such cracks, even though not electrostatically charged, that is demonstrably not the case where the cracks are finer. It is in the detection of the finer and less easily discernible cracks that our method is found most useful. If uncharged finely divided particles are directed against surfaces containing these finer cracks, even though the surfaces have previously been prepared in the most favorable ways for indicating cracks by the method of our invention, there is absolutely no preferential building up of adherent deposits of the solid particles at such cracks.

We have also observed that the character of the liquid used in treating the surfaces to be tested has a marked effect upon the type of result obtained. Liquids that are not miscible with water, such as liquid hydrocarbons and organic solvents of the water-immiscible type, are not operative. On the other hand, organic liquids that are miscible with water, such as the various water soluble alcohols and ketones, can be used with fairly satisfactory results alone, or can be used satisfactorily in admixture with water. Distilled water itself is not a very good medium for our purposes, nor is an acidified water so satisfactory, but a water on the alkaline side, and particularly a neutral or alkaline water containing a surface tension reducing agent, is most satisfactory. In general, we have found that the liquid medium used in preparing the surface for test should be one that wets the surface, that is non-acid, and that is at least somewhat electrically conductive. Preferably, the liquid medium should have a surface tension below that of water so as to have both good wetting and penetrating powers, and also so as to facilitate drying of the surface in the superficial drying step.

We have found it advantageous to heat the surface that is to be tested. It seems probable that heating to some extent increases the effect of capillary attraction by rendering the pre-treating liquid medium more mobile. However, one of the primary advantages of preheating the surface prior to the application of the pre-treating liquid medium, or penetrant, is that when this is done, the method is substantially unaffected by high relative humidity in the circumambient air. We found that without the pre-heating, the method was not very efficient at relative humidities of 35% and above, but that when the pre-heating step was used, the method worked very satisfactorily to give good, consistent results within any of the usual ranges of relative humidity to be found in plants where the method would normally be employed.

The nature of the solid particles used in the testing has also an effect upon the results obtained by the use of our method. In general, any finely divided solids can be employed, but we have found it preferable to employ non-hygroscopic inorganic substances capable of being highly charged electrostatically. Calcium carbonate, or precipitated chalk, has thus far been found to be one of the best materials. However, it is possible to use talc, powdered mica, diatomaceous earth, clays such as kaolin, calcium sulfate, iron oxide, carbon black, aluminum powder, and many others. For commercial applications, the powder used should not be capable of producing silicosis, nor should it be combustible or capable of supporting combustion. In applying the powder we have found it most satisfactory to suspend the powder in a stream of gas, such as air, but the powder can be sifted onto or otherwise applied in a dispersed condition to the surface undergoing testing.

It is therefore an important object of our invention to provide a method of detecting surface discontinuities in materials that are relatively poor conductors of electricity, whereby any surface discontinuities may be rendered clearly visible to the unaided eye of an inspector and not only the existence of such surface discontinuity but also its approximate size and extent made readily apparent.

It is a further important object of this invention to provide a method of detecting the existence of cracks in electrically non-conductive surfaces, such as vitreous or ceramic surfaces, the surfaces of synthetic plastics, hard rubber and like compositions having relatively good dielectric properties, the method including the application to certain surfaces of electrostatically charged, finely divided particles that by virtue of a proper pre-treatment of the surfaces are caused to be preferentially attracted to the cracks, if any, in such surfaces and to form adherent agglomerations, or deposits, at such cracks to render the presence and location of the cracks clearly visible.

It is a further important object of this invention to provide a method for testing surfaces for cracks in accordance with which the surfaces are pre-treated with an aqueous type of liquid penetrant, after which the surfaces are superficially dried and electrostatically charged finely divided solid particles are directed against such surfaces, whereupon if any cracks are present the charged particles are preferentially attracted and caused to adhere as readily visible agglomerations or deposits at the cracks themselves.

Other and further important objects of this invention will become apparent from the disclosures in the specification and the accompanying drawings.

On the drawings:

Figure 1 is a somewhat schematic view, with parts broken away, of apparatus suitable for carrying out the method of our invention.

Figure 2 is an enlarged fragmentary, sectional view taken substantially along the line II—II of Figure 1.

Figure 3 is an enlarged, broken fragmentary view of a bottle that has been tested, showing the indications of cracks as revealed by our method.

The method of our invention will be described in connection with the testing of beer bottles, or the like, to detect the presence of cracks or other surface discontinuities that would render the beer bottles unsuitable for use. In general, however, any surface that is a relatively poor conductor of electricity, or, as a corollary, has relatively good dielectric properties, can be tested in accordance with the method of our invention. By way of example, articles that are wholly formed of or are surfaced with vitreous or ceramic materials, any of the various synthetic plastics, such as Bakelite and the like, or hard rubber compositions, may be tested by the method of our invention for the presence of cracks and other surface discontinuities, and especially such cracks as are not readily discernible by a quick inspection with the unaided eye.

As illustrated in Figure 1, a glass bottle 10, such as a beer bottle, may be the specimen to be tested. The surface of the bottle is first wetted with an aqueous type of liquid. This may be done by rinsing the surface in a bath of the pre-treating liquid, by spraying the surface or by applying the liquid to the surface by means of a sponge or other absorbent device that has been wet with the pre-treating liquid. Preferably, the surface is heated to an elevated temperature below 100° C., before the application of the pre-treating liquid, the liquid then applied and the surface superficially dried, as by wiping with a dry cloth, by drying in a heated atmosphere or by blowing warm air against the surface.

The prepared bottle is then placed upon a conveyor, indicated generally at 11, comprising a supporting table 12, rolls 13 and 14, of which roll 13 is driven, as by a belt 15, and an endless conveyor belt 16 trained around said rolls 13 and 14. A stationary strip 35 lies parallel to and against an edge of the belt 16 with its upper surface in the same plane as that of the upper surface of the belt. The bottles thus rest partly on the traveling conveyor belt 16 and partly on the stationary strip 35. A pair of starting and stopping switches, 17 and 18, are placed at properly spaced points along the length of travel of the conveyor belt 16. These switches are operated by the movement of the bottles 10 to energize and de-energize, successively, a solenoid operated valve 19, to which the switches are connected through a breaker 36 by pairs of lead wires 20 and 21.

The solenoid operated valve 19 is positioned in a gas line 22, into which compressed air or other gas is introduced through a pressure regulating valve 23. A pressure gauge 24 is associated with said valve 23 to indicate the pressure at which air, or other gas, is admitted into the piping 22 to the solenoid operated valve 19, and thence through a continuation of said piping to an aspirating nozzle 25.

Said aspirating nozzle 25 is preferably formed of hard rubber, or other good dielectric material, and is connected at its reduced throat portion to an open container 26 for containing the finely divided powdered material used in the testing. The open end of the nozzle 25, as at 27, is directed toward a bottle 10 as it passes between the switches 17 and 18, and particularly toward the upper or neck portion of the bottle, since it is there that the cracks are most usually found. In order for the gas laden stream of finely divided particles, indicated at 28, to come into contact with the entire circumference of the bottle, the bottles 10 are rotated as they travel along on the conveyor belt 16. This is accomplished by the provision of the stationary strip 35 in cooperation with the moving belt 16. Side rails 29 are provided to keep the bottles from falling off of the belt and stationary strip. The friction of part of the bottle bottom against the stationary surface causes the bottle to rotate about its own axis as it progresses the length of the conveyor belt.

In passing through the hard rubber nozzle 25, the finely divided solid particles are electrostatically charged, due to friction set up between the particles and the internal surface of the nozzle. A comparatively high electrostatic charge is imparted to the finely divided particles by virtue of the frictional contact between the particles and the internal wall surface of the nozzle, and particularly is this so if the finely divided particles and the gaseous current used to suspend them are both relatively dry. Other means of imparting electrostatic charges to the particles may be used. For instance a metal nozzle may be used in place of the hard rubber nozzle and a Toepler-Holtz static generator, or other suitable type of static generator, may be connected to the metal nozzle for imparting the electrostatic charge to the particles passing therethrough. We have found, however, that a hard rubber nozzle gives superior results to any means yet investigated for the artificial induction of static electricity by means of static machines.

If a bottle tested in accordance with the method above described has a crack in it, the solid particles will collect at the crack and form a deposit there, the extent of which will roughly correspond with the extent of the crack and the thickness of which will depend in part upon the dimensions of the crack but more particularly upon the density of the solid particles per unit volume of the gas stream and the length of time during which the particle laden gas stream is directed against the portion of the bottle surface including the crack.

As indicated in Figure 3, a crack in the neck of the bottle 10 is shown by a deposit 30 and a plurality of cracks in the rim of the bottle by deposits 31 and 32. These deposits usually are comparatively dense and compact, in contrast to the light fluffy nature of the powder introduced into the gas stream.

Where the bottle 10 is formed of brown glass, as is frequently true of beer bottles, a white powder will form a deposit that is clearly visible at a distance to the unaided eye. Where desired, the powder can be colored, or a pigment used of a color that will contrast with the color of the surface undergoing test. A fluorescent pigment may be used, if desired, and the results observed under irradiation from a source of ultraviolet light.

As earlier stated, the pre-treating liquid medium, or penetrant, is preferably an aqueous type of liquid, by which is meant water itself, an aqueous solution or a water-miscible liquid. Water-miscible liquids that have been found satisfactory are the water-miscible alcohols, such as methyl, ethyl, propyl and butyl, and the polyhydric alcohols, such as glycerol, and the water-soluble glycols and glycol derivatives, and also the water-soluble ketones such as methyl ethyl ketone. These water-miscible liquids may be used by themselves, but are preferably admixed with water. While distilled water itself will give fair results, it is preferable to include a wetting agent in the water, such as any of the water-soluble salts of the alkylated naphthalene sulfonic acids or of the sulfated or sulfonated higher molecular weight alcohols, as, for instance, sulfated lauryl alcohol. Other commonly known wetting agents, such as the sodium sulfo-succinimides, the dialkyl esters of sodium sulfo-succinic acid, and the like may be employed. In general, it is desirable to use an aqueous type of liquid having a surface tension less than about 50 dynes per cm. The penetrant should be either neutral or on the alkaline side, since if on the acid side, it does not work so satisfactorily. This may, however, be dependent upon the nature of the charge of the electrostatically charged particles or upon the nature of the surface that is being tested.

Of the solid substances that can be used in finely divided particle form for testing purposes, those that are non-hygroscopic and have good dielectric properties are most suited. Calcium carbonate in a chemically pure form, or available as precipitated chalk, is one of the best thus far tested. Other materials that can be used in powdered form include magnesium oxide, iron oxide, mica, diatomaceous earth, kaolin, alkaline earth and magnesium carbonates and sulfates, talc, carbon black and others. The particle size is not particularly critical, but preferably an air-floated powder is used for our purposes.

One of the principal advantages of our invention is that inspection for cracks or surface discontinuities can be carried out in a bottling line without elaborate equipment and without necessarily slowing down the plant production or requiring additional operators. Another very real advantage is the considerable saving in time, labor and expense resulting from the culling of defective bottles, containers and the like prior to their use in the bottling or filling operation.

It will, of course, be understood that various details may be varied through a wide range without departing from the principles of this invention and it is, therefore, not the purpose to limit the patent granted hereon otherwise than necessitated by the scope of the appended claims.

We claim as our invention:

1. The method of testing an electrically non-conductive surface for surface discontinuities, which comprises wetting said surface with water containing a surface tension reducing agent, superficially drying said surface, and dusting said surface with electrostatically charged particles having optical characteristics differing from those of said surface, whereupon a preferential adherence of said particles will occur at the locus of any surface discontinuities present.

2. The method of testing an electrically non-conductive surface for surface discontinuities, which comprises heating said surface, wetting said surface with an aqueous type, non-acid liquid, superficially drying said surface, and dusting said surface with electrostatically charged particles having optical characteristics differing from those of said surface, whereupon a preferential adherence of said particles will occur at the locus of any surface discontinuities present.

3. The method of testing articles having dielectric surfaces for surface discontinuities, which comprises wetting such surface with a hydrophilic liquid, superficially drying said surface, and directing a gaseous stream of electrostatically charged particles against said surface, said particles having optical characteristics differing from those of said surface, whereupon a preferential adherence to said surface of said particles will serve to indicate a surface discontinuity.

4. The method of testing articles having dielectric surfaces for surface discontinuities, which comprises heating such surface, wetting such surface with an aqueous non-acid liquid, superficially drying said surface, and directing a gaseous stream of electrostatically charged particles against said surface, said particles having optical characteristics differing from those of said surface, whereupon a preferential adherence to said surface of said particles will serve to indicate a surface discontinuity.

5. The method of testing articles having dielectric surfaces for surface discontinuities, which comprises wetting such surface with an aqueous non-acid liquid containing a wetting agent, superficially drying said surface, and directing a gaseous stream of electrostatically charged solid particles against said surface, said particles having optical characteristics differing from those of said surface, whereupon a preferential adherence to said surface of said particles will serve to indicate a surface discontinuity.

6. The method of testing surfaces of relatively good dielectric properties when dry, which comprises wetting said surfaces with an aqueous non-acid electrolyte, superficially drying said surfaces, and contacting said surfaces with electrostatically charged finely divided solid particles having optical characteristics differing from those of said surface, whereupon a preferential attraction of such particles to a portion of said surfaces serves to indicate the position and extent of any surface discontinuity present.

7. The method of testing surfaces of relatively good dielectric properties when dry, which comprises heating said surfaces, wetting said surfaces with an aqueous non-acid electrolyte, superficially drying said surfaces, and contacting said surfaces with electrostatically charged finely divided solid particles having optical characteristics differing from those of said surface, whereupon a preferential attraction of such particles to a portion of said surfaces serves to indicate the position and extent of any surface discontinuity present.

8. The method of testing a glass article for cracks, which comprises wetting the surface of the glass with a non-acid water solution of a wetting agent, superficially drying said surface, creating an atmosphere of gas-suspended electrostatically charged particles in contact with said glass surface, said particles having optical characteristics differing from those of said surface, and noting any preferential adherence of said particles to said surface.

9. The method of testing a glass article for cracks, which comprises heating said article, wetting the surface of the glass with a non-acid water solution of a wetting agent, superficially drying said surface, creating an atmosphere of gas-suspended electrostatically charged particles in contact with said glass surface, said particles having optical characteristics differing from those of said surface, and noting any preferential adherence of said particles to said surface.

10. A method of testing for surface discontinuities in an electrically non-conductive surface, which comprises applying to said surface an aqueous type of liquid, removing superficial liquid from said surface and applying to said surface an electrostatically charged powder having optical characteristics different from those of said surface, whereupon a preferential adherence of said powder in distinctive masses will indicate the presence and location of a surface discontinuity.

11. The method of testing for surface discontinuities in an electrically non-conductive surface, which comprises applying to said surface an aqueous type of liquid, removing superficial liquid from said surface and applying to said surface an electrostatically charged powder having a visual coloration differing from that of said surface, whereupon a preferential adherence of said powder in distinctive masses will indicate the presence and location of a surface discontinuity.

12. The method of testing for surface discontinuities in an electrically non-conductive surface, which comprises applying to said surface an aqueous type of liquid, removing superficial liquid from said surface and applying to said surface an electrostatically charged luminescent powder having a coloration under exciting illumination differing from that of said surface, whereby a preferential adherence of said powder in distinctive masses will indicate the presence of a surface discontinuity.

13. A method of testing an electrically non-conductive surface for surface discontinuities, which comprises wetting said surface with water containing a surface tension reducing agent, superficially drying said surface, and dusting said surface with electrostatically charged particles having a visual coloration differing from that of said surface, whereupon a preferential adherence of said particles will occur at the locus of any surface discontinuities present.

14. The method of testing an electrically non-conductive surface for surface discontinuities, which comprises wetting said surface with water containing a surface tension reducing agent, superficially drying said surface, and dusting said surface with electrostatically charged luminescent particles having a coloration under exciting illumination differing from that of said surface, whereupon a preferential adherence of said particles will occur at the locus of any surface discontinuities present.

15. The method of testing articles having dielectric surfaces for surface discontinuities, which comprises wetting said surface with a hydrophilic liquid, superficially drying said surface, and directing a gaseous stream of electrostatically charged particles against said surface, said particles having a visual coloration differing from that of said surface, whereupon a preferential adherence to said surface of said particles will serve to indicate a surface discontinuity.

16. A method of testing articles having dielectric surfaces for surface discontinuities, which comprises wetting said surfaces with a hydrophilic liquid, superficially drying said surface, and directing a gaseous stream of electrostatically charged luminescent particles against said surface, said luminescent particles having a coloration under exciting lumination differing from that of said surface, whereupon a preferential adherence to said surface of said particles will serve to indicate a surface discontinuity.

17. The method of testing surfaces of relatively good dielectric properties when dry, which comprises wetting said surfaces with an aqueous non-acid electrolyte, superficially drying said surfaces, and contacting said surfaces with electrostatically charged finely divided solid particles having a visual coloration differing from that of said surface, whereupon a preferential attraction of such particles to a portion of said surface serves to indicate the position and extent of any surface discontinuity present.

18. The method of testing surfaces of relatively good dielectric properties when dry, which comprises wetting said surfaces with an aqueous non-acid electrolyte, superficially drying said surfaces, and contacting said surfaces with electrostatically charged finely divided solid luminescent particles, said luminescent particles having a coloration under exciting illumination differing from that of said surface, whereupon a preferential attraction of such particles to a portion of said surface serves to indicate the position and extent of any surface discontinuity present.

19. In a method of testing for surface discontinuities in a wetted electrically non-conductive surface, the steps of removing superficial liquid from said surface and applying to said surface an electrostatically charged powder having optical characteristics differing from those of said surface, whereupon a preferential adherence of said particles will occur at the locus of any surface discontinuities present.

20. In a method of testing for surface discontinuities in a previously wetted electrically non-conductive surface, the steps of superficially drying said surface, and dusting said surface with electrostatically charged particles having optical characteristics differing from those of said surface, whereupon the preferential adherence of said particles will occur at the locus of any surface discontinuities present.

21. In a method of testing for surface discontinuities in an electrically non-conductive surface which is superficially dry but which has an aqueous type liquid present in any surface discontinuities present therein, the improvement which comprises applying to said surface electrostatically charged finely divided particles having optical characteristics differing from those of said surface, whereupon a preferential adherence of said particles to said surface will occur at the locus of any surface discontinuities present.

22. In a method of testing for surface discontinuities in an electrically non-conductive surface which is superficially dry but which has an aqueous type liquid present in any discontinuities present therein, the steps of suspending an electrostatically charged powder in a fluid stream, said powder comprising finely divided particles having optical characteristics differing from those of said surface, and directing said stream against said surface to deposit said particles thereon, whereupon a preferential adherence of said particles will occur at the locus of any surface discontinuities present.

TABER DE FOREST.
HENRY N. STAATS.

REFERENCES CITED

The following references are of record in the file of this patent:

UNITED STATES PATENTS

| Number | Name | Date |
| --- | --- | --- |
| 2,128,228 | Betz et al. | Aug. 30, 1938 |
| 2,236,373 | Kowalski | Mar. 25, 1941 |
| 2,259,400 | Switzer | Oct. 14, 1941 |
| 2,365,253 | De Forest | Dec. 19, 1944 |